US011244285B2

(12) United States Patent
Lederer

(10) Patent No.: US 11,244,285 B2
(45) Date of Patent: Feb. 8, 2022

(54) METHOD AND APPARATUS FOR DISPLAYING E-MAIL MESSAGES

(71) Applicant: RingCentral, Inc., Belmont, CA (US)

(72) Inventor: Thomas Lederer, Herrsching (DE)

(73) Assignee: RINGCENTRAL, INC., Belmont, CA (US)

( * ) Notice: Subject to any disclaimer, the term of this patent is extended or adjusted under 35 U.S.C. 154(b) by 441 days.

(21) Appl. No.: 15/617,232

(22) Filed: Jun. 8, 2017

(65) Prior Publication Data
US 2017/0279750 A1    Sep. 28, 2017

Related U.S. Application Data

(63) Continuation of application No. 14/361,118, filed as application No. PCT/EP2012/004287 on Oct. 12, 2012, now abandoned.

(51) Int. Cl.
*G06Q 10/10* (2012.01)
*H04L 12/58* (2006.01)

(52) U.S. Cl.
CPC ........... *G06Q 10/107* (2013.01); *H04L 51/08* (2013.01); *H04L 51/16* (2013.01)

(58) Field of Classification Search
CPC .................................................. G06Q 10/107
See application file for complete search history.

(56) References Cited

U.S. PATENT DOCUMENTS

| 5,835,084 A | 11/1998 | Bailey et al. |
| 6,985,923 B1 | 1/2006 | Bates et al. |
| 7,506,263 B1 | 3/2009 | Johnston et al. |
| 8,904,292 B2 * | 12/2014 | Fan ...................... G06Q 10/107 715/752 |

(Continued)

FOREIGN PATENT DOCUMENTS

WO    2008023069 A2    2/2008

OTHER PUBLICATIONS

Written Opinion of the International Searching Authority for PCT/EP2012/004287 dated Jul. 3, 2013 (Form PCT/ISA/237).

(Continued)

*Primary Examiner* — William L Bashore
*Assistant Examiner* — Nathan K Shrewsbury
(74) *Attorney, Agent, or Firm* — Finnegan, Henderson, Farabow, Garrett & Dunner LLP

(57) ABSTRACT

A method for displaying e-mail messages to a user of an e-mail message viewer comprises displaying a list of received e-mail messages with a list entry for each received email message and displaying binary information indicating the read/unread status of each received email message in the list. The read/unread status information of each received first email message is switched from "unread" to "read" when the text and/or attachments of this particular first e-mail message have been displayed at least partially to the user when opening this particular first e-mail message. The read/unread status information of each received second email message is switched from "unread" to "read" when the text and/or attachments of this particular second e-mail message have been displayed at least partially to the user when opening a particular first e-mail message.

18 Claims, 4 Drawing Sheets

(56) References Cited

U.S. PATENT DOCUMENTS

| | | | |
|---|---|---|---|
| 2002/0065892 A1* | 5/2002 | Malik | G06Q 10/107 |
| | | | 709/206 |
| 2002/0073157 A1* | 6/2002 | Newman | H04L 29/06 |
| | | | 709/206 |
| 2002/0091774 A1 | 7/2002 | Imamura et al. | |
| 2002/0184315 A1* | 12/2002 | Earnest | H04L 51/12 |
| | | | 709/206 |
| 2003/0110227 A1 | 6/2003 | O'Hagan | |
| 2005/0198579 A1 | 9/2005 | Perepa et al. | |
| 2005/0223057 A1 | 10/2005 | Buchheit et al. | |
| 2005/0223067 A1* | 10/2005 | Buchheit | G06Q 10/107 |
| | | | 709/206 |
| 2005/0234850 A1 | 10/2005 | Buchheit et al. | |
| 2005/0234910 A1* | 10/2005 | Buchheit | G06F 16/248 |
| 2007/0038710 A1* | 2/2007 | Li | G06Q 10/107 |
| | | | 709/206 |
| 2007/0078941 A1 | 4/2007 | Dun et al. | |
| 2009/0067389 A1 | 3/2009 | Lee et al. | |
| 2009/0094335 A1* | 4/2009 | Edmonds | G06F 15/16 |
| | | | 709/206 |
| 2009/0106373 A1* | 4/2009 | Schmidt-Karaca | |
| | | | G06Q 10/107 |
| | | | 709/206 |
| 2009/0119678 A1 | 5/2009 | Shih et al. | |
| 2009/0132490 A1* | 5/2009 | Okraglik | H04L 51/22 |
| 2009/0198785 A1 | 8/2009 | Uchiyama et al. | |
| 2009/0287779 A1* | 11/2009 | Haynes | G06Q 10/107 |
| | | | 709/206 |
| 2010/0023583 A1* | 1/2010 | Carmel | G06Q 10/107 |
| | | | 709/206 |
| 2010/0250691 A1 | 9/2010 | Tomkow | |
| 2010/0262922 A1 | 10/2010 | Fan et al. | |
| 2011/0010182 A1* | 1/2011 | Turski | |
| 2011/0145346 A1 | 6/2011 | Gnech, III et al. | |
| 2011/0258264 A1 | 10/2011 | Bremner et al. | |
| 2013/0275899 A1 | 10/2013 | Schubert et al. | |
| 2016/0196031 A1* | 7/2016 | Bovet | G06F 3/0482 |
| | | | 345/173 |
| 2021/0008329 A1* | 1/2021 | Sloan | A61M 21/00 |

OTHER PUBLICATIONS

International Search Report for PCT/EP2012/004287 dated Jul. 3, 2013 (Forms PCT/ISA/220, PCT/ISA/210).

* cited by examiner

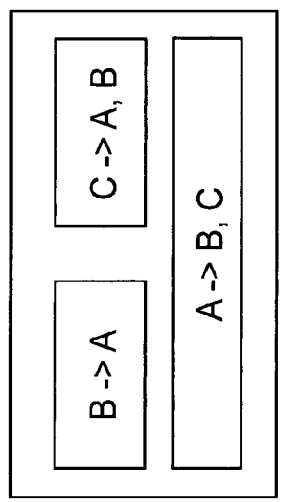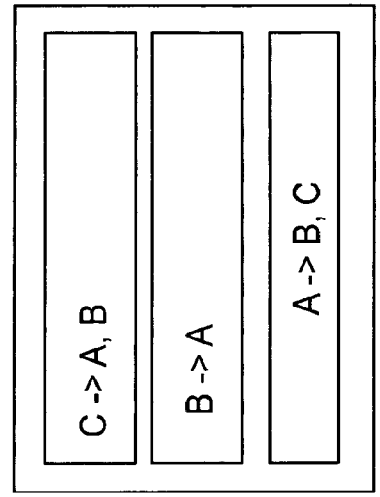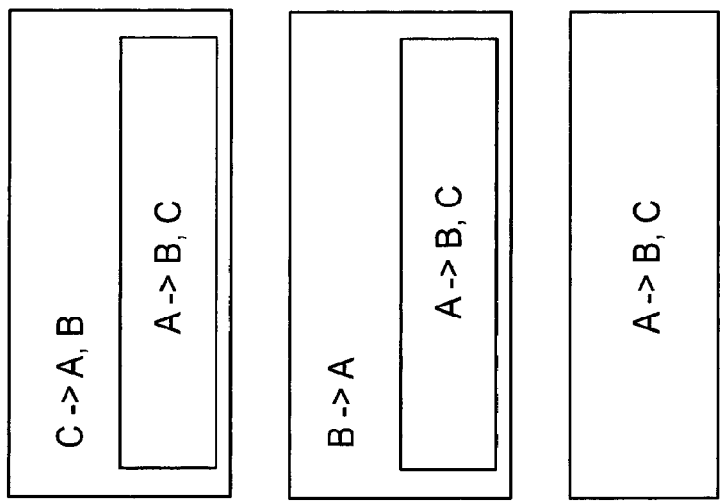

METHOD AND APPARATUS FOR DISPLAYING E-MAIL MESSAGES

CROSS-REFERENCE TO RELATED APPLICATIONS

This application is a continuation application of U.S. patent application Ser. No. 14/361,118, which is the United States national phase of PCT International Patent Application No. PCT/EP2012/004287, filed on Oct. 12, 2012. The entirety of U.S. patent application Ser. No. 14/361,118 is incorporated by reference herein.

BACKGROUND OF THE INVENTION

Field of the Invention

Embodiments relate generally to a method and an apparatus for displaying e-mail messages.

Background of the Related Art

E-mail is nowadays a common communication tool both for business and private use. E-mail messages are received by a user's e-mail account associated with an e-mail service provider and stored on an e-mail server operated by the e-mail provider. A user, e.g. the owner of the e-mail account, may access newly received e-mail messages either by logging in to the e-mail account by help of a web browser running on the user's computer, which displays messages stored on the server or be retrieving messages by help of an e-mail retrieving protocol like e.g. POP or IMAP from the server together with an e-mail client software running on the user's computer. Other methods are possible but less frequently used.

Electronic mail, also known as e-mail (or email), is a method of sending digital messages from a sender to one or more recipients. E-mail usually is transmitted via the Internet or other computer networks. Modern e-mail systems are based on a store-and-forward type transmission. E-mail servers accept, forward, deliver and store messages. Neither the users nor their computers are required to be online simultaneously; they need connect only briefly, typically to an e-mail server, for as long as it takes to send, write, read or receive messages.

An Internet e-mail message usually consists of three components, the message envelope, the message header, and the message body. The message header contains control information, preferably including, an originator's e-mail address and one or more recipient addresses. Preferably, descriptive information is also added, such as a subject header field and a message submission date/time stamp. Originally a text-only (7-bit ASCII and others) communications medium, email was extended to carry multi-media content attachments, a process standardized in RFC 2045 through 2049. Collectively, these RFCs have come to be called Multipurpose Internet Mail Extensions (MIME).

Many e-mail providers host their serves as web-based e-mail. Users may log into their e-mail account by the help of an Internet (or Web) browser to send and receive their e-mail. POP (e.g. POP3) refers to Post Office Protocol (3). POP is an application-layer Internet standard protocol used by local e-mail clients to retrieve e-mail from a remote server over a TCP/IP connection. POP and IMAP (Internet Message Access Protocol) are the two most prevalent Internet standard protocols for e-mail retrieval. It is a leading email account type on the Internet. In a POP e-mail account (i.e. an account supporting POP3 protocol), e-mail messages are downloaded to your computer and then they are (optionally) deleted from the e-mail server. It is difficult to save and view messages on multiple computers. Also, the messages sent from a first computer are usually not copied to the Sent Items folder on a second computer. E-mail clients using POP generally connect, retrieve all messages, store them on the user's PC as new messages, delete them from the server, and then disconnect. Other protocols, notably IMAP, (Internet Message Access Protocol) provide more complete and complex remote access to typical mailbox operations. Many e-mail clients support POP as well as IMAP to retrieve messages; however, fewer Internet Service Providers (ISPs) support IMAP.

IMAP is an acronym for Internet Message Access Protocol. It is an alternative to the POP3 e-mail protocol. With an Internet Message Protocol (IMAP) account, a user access to mail folders on the mail server and you can use any computer to read your messages wherever you are. It shows the headers of messages, the sender and its subject and a user may choose to download only those messages he or she wants to read. Usually mail is saved on the e-mail server, therefore it is safer and it is backed up on the e-mail server.

Like most client programs, an email client is only active when a user runs it. The most common arrangement is for an email user (the client) to make an arrangement with a remote Mail Transfer Agent (MTA) server for the receipt and storage of the client's emails. The MTA, using a suitable mail delivery agent (MDA), adds email messages to a client's storage as they arrive. The remote mail storage is referred to as the user's mailbox. Users of a suitable system may, of course, log-in and run a mail client on the same computer that hosts their mailboxes. In this case, the server is not actually remote, other than in a generic sense.

Emails are stored in the user's mailbox on the remote server until the user's email client requests them to be downloaded to the user's computer, or can otherwise access the user's mailbox on the possibly remote server. The email client can be set up to connect to multiple mailboxes at the same time and to request the download of emails either automatically, such as at pre-set intervals, or the request can be manually initiated by the user.

A user's mailbox may be accessed in several ways. The Post Office Protocol (POP) allows the user to download messages one at a time and only deletes them from the server after they have been successfully saved on local storage. It is possible to leave messages on the server to permit another client to access them. However, there is no provision for flagging a specific message as seen, answered, or forwarded, thus POP is not convenient for users who access the same mail from different machines.

Alternatively, the Internet Message Access Protocol (IMAP) allows users to keep messages on the server, flagging them as appropriate. IMAP provides folders and sub-folders, which can be shared among different users with possibly different access rights. Typically, the Sent, Drafts, and Trash folders are created by default. In addition, the mailbox storage can be accessed directly by programs running on the server or via shared disks. Direct access can be more efficient but is less portable as it depends on the mailbox format; it is used by some email clients, including some webmail applications.

Regardless of which way is chosen for accessing newly received e-mail messages, the user usually faces the task to inspect or at least to look over a more or less large number of newly received messages daily if not several times during a (working) day. Since among the newly received messages there usually is a considerable portion of unwanted messages, the so-called "junk mail", which have to be carefully distinguished from important messages, viewing newly received e-mail messages is a time-consuming task for most individuals that deserves some attention for optimization to facilitate our daily lives.

BRIEF SUMMARY OF THE INVENTION

The present invention therefore aims at improving known methods of displaying e-mail messages to users of computer systems.

According to the present invention a method is provided where a list of received e-mail messages is displayed to a user with a list entry for each received email message. Furthermore, binary information indicating the read/unread status of each received email message in the list is displayed. The read/unread status information of each received first email message is switched from "unread" to "read" when the text and/or attachments of this particular first e-mail message have been displayed at least partially to the user when opening this particular first e-mail message, and the read/unread status information of each received second email message is switched from "unread" to "read" when the text and/or attachments of this particular second e-mail message have been displayed at least partially to the user when opening a particular first e-mail message.

BRIEF DESCRIPTION OF THE FIGURES

FIG. 4a shows contents of several received e-mail messages as displayed according to the prior art;

FIGS. 4b and 4c show contents of several received e-mail messages as displayed according to a preferred embodiment of the invention.

DETAILED DESCRIPTION OF THE INVENTION

Figure 1:
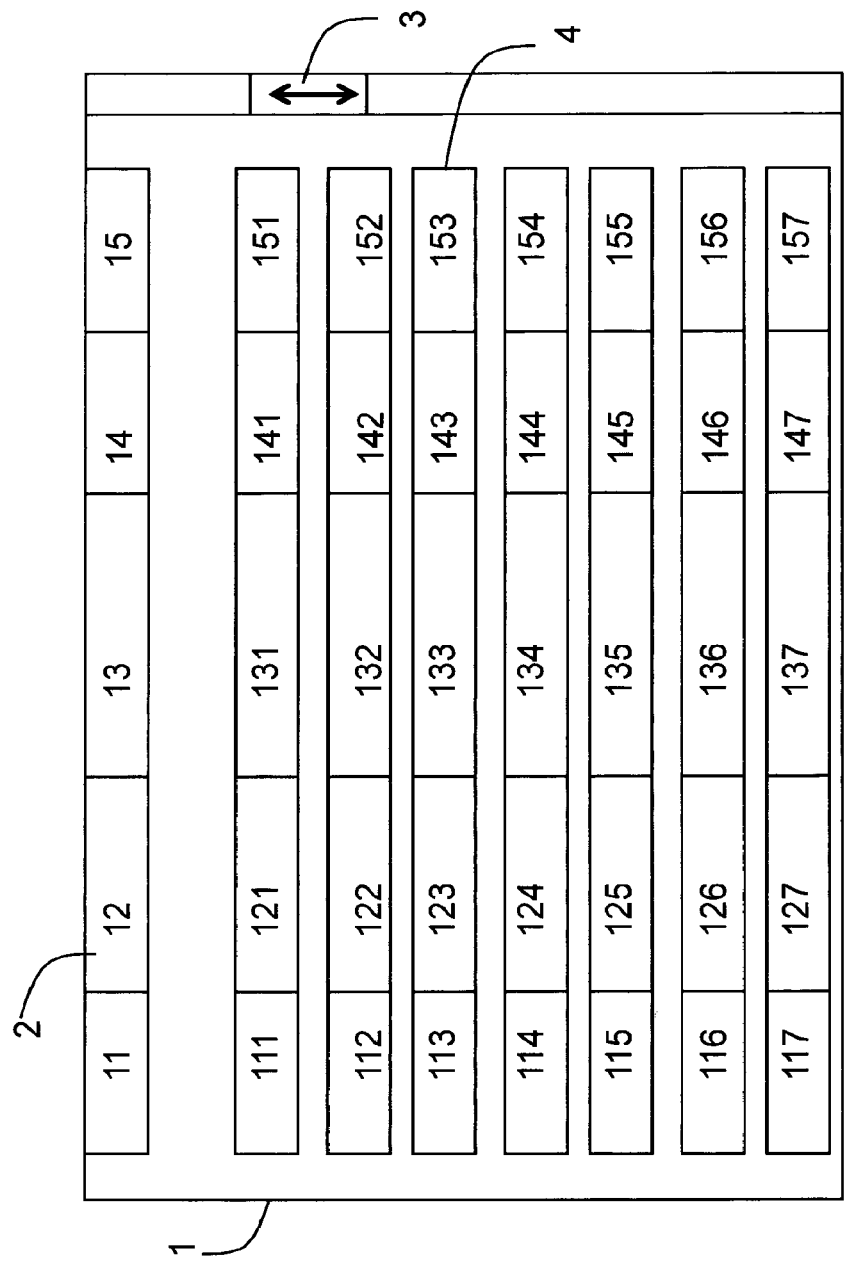
FIG. 1 shows a display of a list of received e-mail messages.

In the present context the term "list", especially the term "list of received e-mail messages" shall refer to a representation of a collection of data objects, especially of received e-mail messages, in which each data object, especially each received e-mail message is represented by a list entry, a list entry preferably being displayed as a line in a table comprising at least one column and preferably several lines, each line representing one data object, especially a single e-mail message. Such a list is frequently referred to as in in-box by users of e-mail clients.

Each data object (i.e. each received e-mail message) represented in this list is associated with a binary information (sometime called a "status flag") indicating the read/unread status of this e-mail message. The possible binary values this status flag may assume may be called "read" and "unread" respectively. These binary values may be displayed by colors or symbols or in any way deemed suitable to inform a user about the read/unread status of this e-mail message.

The read/unread status information of each received first email message is switched from "unread" to "read" when the text and/or attachments of this particular first e-mail message have been displayed at least partially to the user when opening this particular first e-mail message. This way, a user may easily keep track of unread messages he or she still has or wants to read and does not have to open a message read earlier in order to check if this message has been read earlier or not.

According to the invention, in addition to this, the read/unread status information of each received second email message is switched from "unread" to "read" when the text and/or attachments of this particular second e-mail message have been displayed at least partially to the user when opening a particular first e-mail message, which—is at least logically—different from the second e-mail message. Being different at least logically shall mean, that although the message contents of the message, comprising the message text and possible attachments, may be identical, the second message differs from the first one in at least one feature, e.g. the time of arrival at the recipient or any other data feature.

If a user now inspects his or her e-mail in-box or account starting from the latest entries going down to the messages received earlier, he may skip i.e. not open messages received earlier belonging to the same issue, topic or thread, if the messages received later contain the contents of the messages received earlier, as is frequently the case with messages belonging to the same issue, because these earlier messages have been marked as "read" when the user actually read the messages received later. This advantageous feature of the invention frequently considerably reduces the burden of the user to read all received e-mail messages.

Preferably, this feature of the method according to the invention may be achieved by a software running on the user's personal computer or other personal information technology equipment or on a provider's information technology equipment, which is permanently monitoring texts or more generally contents displayed to the user when reading his received messages and comparing these displayed texts and/or contents with contents of other e-mails received by the same user. The comparison may be restricted to messages within a certain thread or sharing other common features, such as common originators, belonging to certain groups of participants, comprising common words in subject fields, etc.

Preferably, this search intelligently deals with formal transformations of texts like insertions of symbols like ">>" or similar insertions which do not change the meaning of the message contents.

According to a preferred embodiment of the present invention the read/unread status information of each received second email message is switched from "unread" to "read" when the text and attachments of this particular second e-mail message have been displayed completely to the user when opening a particular first e-mail message. In this preferred embodiment it can be made sure that a user at least saw all the information contained in other, especially in earlier, messages which are now marked as read according to the invention.

According to a preferred embodiment of the present invention each received second email message is hidden when the text and attachments of this particular second e-mail message have been displayed completely to the user when opening a particular first e-mail message. Hiding a message may be done by displaying such a message in grey or in a separate list while removing this message from the first list. Other ways of hiding a message may be easily found by the skilled person.

According to a preferred embodiment of the present invention a reference to or copy of the text and/or an attachments is displayed to the user, of a second e-mail message, hidden or displayed as "read" according to one of the preceding claims, in a first e-mail message, not or only partially containing this text and/or attachments.

According to a preferred embodiment of the present invention information about the origin of text and/or attachments copied or referred to is indicated to the user. This way, a user may track the origin of a text and/or attachments copied or referred to in a message. According to a preferred embodiment of the present invention information about the originator or sender of text and/or attachments copied or referred to is indicated to the user. This way, a user may track the originator or sender of a text and/or attachments copied or referred to in a message.

According to a preferred embodiment of the present invention information about the time of origin of text and/or attachments copied or referred to is indicated to the user.

According to the present invention, an apparatus for displaying visual information about participants in a teleconference, the apparatus comprises a display for displaying a list of received e-mail messages and a processor and storage means for running software are provided.

Figure 2A:
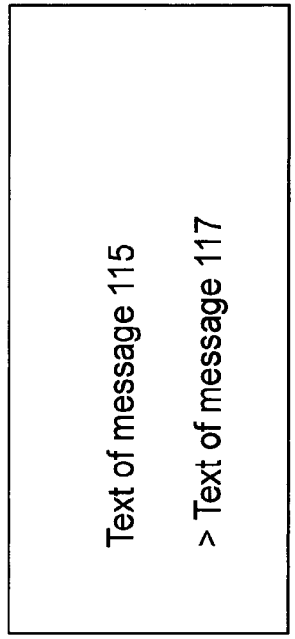
FIGS. 2a, 2b, 2c and 2d show the contents of several received e-mail messages as displayed according to the prior art.
Figure 2C:
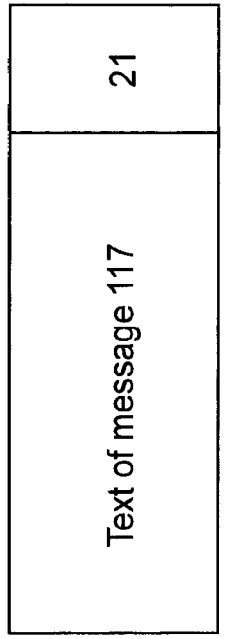
Figure 2B:
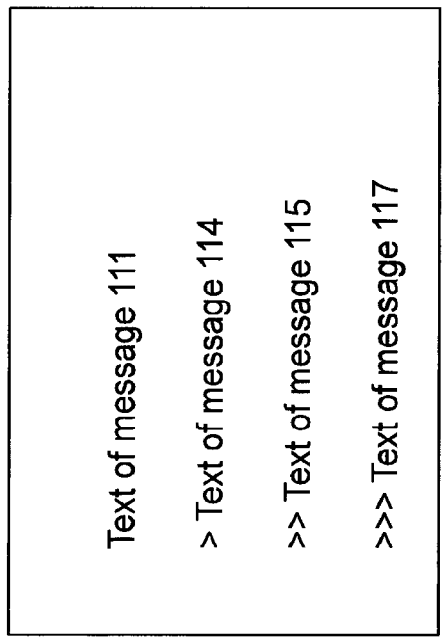
Figure 2D:
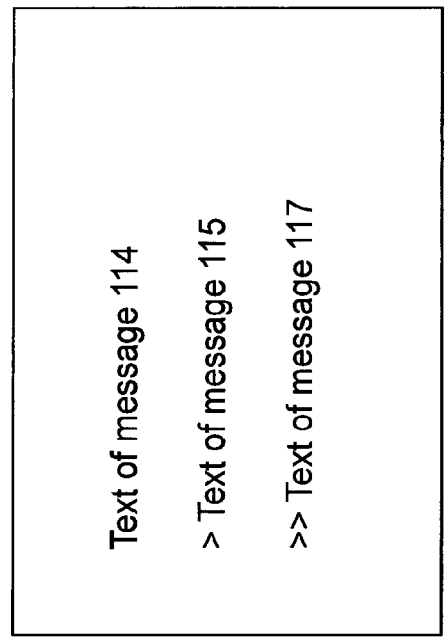

In a typical environment for viewing received e-mails a list of received e-mails is displayed as shown in FIG. 1. A Window 1 of a browser- or e-mail client or equivalent software contains a heading line 2 defining the meanings 11, 12, 13, 14 and 15 of corresponding columns. A scroll bar 3 usually allows navigation to other entries in the list. Each line entry 4 of the list corresponds to a received e-mail message. As columns 11, 12, 13, 14 and 15 might designate the message ID, the sender, the subject, the read/unread flag and an attachment flag or button of each received e-mail, 11n, 12n, 13n, 14n and 15n correspond, e.g., to the message ID, the sender, the subject, the read/unread flag and an attachment flag or button of each received e-mail with message ID 11n with n=1, . . . , 7, . . . . If a user opens message 111, the user will, according to the prior art, see the texts of messages 111, 114, 115 and 117 as indicated in FIG. 2a. If message 114 is opened, the user will, according to the prior art, see the texts of messages 114, 115 and 117 as indicated in FIG. 2b or in an equivalent way. Likewise, if message 115 is opened, the user will, according to the prior art, see the texts of messages 115 and 117 as indicated in FIG. 2b. Finally, opening message 117, the user will see the text of message 117 together with an attachment 21.

Figure 3:
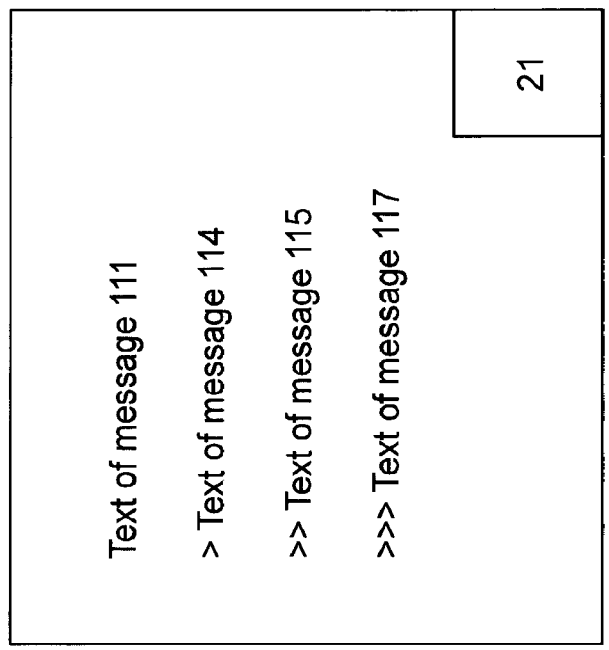
FIG. 3 shows contents of several received e-mail messages as displayed according to a preferred embodiment of the invention.

According to a preferred embodiment of the invention, a user will see the texts of messages 111, 114, 115 and 117 together with attachment 21 when opening message 111, as indicated by FIG. 3. The attachment 21 may be displayed as a symbol, e.g. icon, or as an opened file, depending on the preferences of the user or on the type of embodiment of the invention. Messages 114, 115 and 117 may be marked as "read" and therefore may be skipped by user when reading through is newly received e-mails. These earlier messages may also be hidden by the system, depending on the preferences of the user or on the type of embodiment of the invention.

If e.g. sender A sends a message (A→B,C) to recipients A and C and recipient B sends a message (B→A) referring to (e.g. answering to or commenting on) this message (A→B, C) only to A but not to C and if C subsequently sends a message (C→A,B) referring to (e.g. answering to or commenting on) this message (B→A) to A and B, then according to the prior art, these messages will be displayed to A as indicated in FIG. 4a, or in an equivalent way. The message (A→B, C) is displayed two times (in this example) according to the prior art. According to different preferred embodiments of the invention, these situations may be displayed to user A as indicated in FIG. 4b or 4c. In both embodiments, the message (A→B, C) is only displayed once to user A.

The present invention and its preferred embodiments considerably facilitate the work of a user with large amounts of messages received daily. In the in-box of an e-mail account, a user frequently finds large amounts of e-mail correspondence belonging to a subject or thread, especially a plurality of messages from different persons, belonging to a common subject. Accordingly, for a given subject, there frequently are several messages in a user's message box, including incoming and outgoing messages.

On answering a message, the history of the correspondence, i.e. earlier messages belonging to the same subject, are usually copied into the current message, possibly after indentation of the copied message contents. Therefore it is usually sufficient to read only the message received last, because this message includes the information of all prior messages.

The present invention allows relieving the user from the obligation to read contents actually read earlier when reading through earlier messages. This is achieved by using information technology, e.g. computer suitable software, to automatically compare texts of messages and to present the information in a more suitable, i.e. compact way to the user. As not every message in a mail correspondence include all attachments, because attachments are not duplicated usually in response messages, a receiver of a response message does, according to the prior art, not have direct access to the attachments of earlier messages.

The present invention and/or preferred embodiments of the present invention provides a way to include attachments of earlier messages or a references, e.g. a link or hyperlink, to such attachments in a later message, so that all the information contained in a chain of message exchanges between several users can be included in a later message. An efficient reading of incoming messages is made possible and multiple reading of the same text or other contents can be avoided. Moreover, a user can easily access all attachments appearing in any message of such a chain of message exchanges between several users easily by opening a later or the last message of a mail thread.

The invention claimed is:

1. A computer-implemented method, comprising:
   receiving a first message and a second message; determining that a first text of the first message matches a second text of the second message;
   determining that a first attachment of the first message matches a second attachment of the second message;
   removing the second message in response to receiving notification that both the first text of the first message and the first attachment of the first message have been displayed; and
   displaying a third text of the second message or a reference to the third text of the second message in the first message, wherein the first message does not contain the third text; and
   displaying, in the first message, a third attachment of the second message or a reference to the third attachment of the second message, the third attachment being not contained in the first message.

2. The computer-implemented method of claim 1, wherein removing the second message comprises changing a status of the second message to read.

3. The computer-implemented method of claim 1, wherein the third text of the second message or the reference to third text is displayed in the first message after the second message is removed.

4. The computer-implemented method of claim 1, wherein causing the reference to be displayed further comprises causing an originator or a time of origin of the second text to be displayed in the first message.

5. The computer-implemented method of claim 1, further comprising:
in response to removing the second message, causing a reference to the second attachment to be displayed in the first message.

6. The computer-implemented method of claim 5, wherein causing the reference to be displayed further comprises causing an originator or time of origin of the second attachment to be displayed in the first message.

7. A non-transitory, computer-readable medium storing a set of instructions that, when executed by a processor, cause:
receiving a first message and a second message;
determining that a first text of the first message matches a second text of the second message;
determining that a first attachment of the first message matches a second attachment of the second message;
removing the second message in response to receiving notification that both the first text of the first message and the first attachment of the first message have been displayed completely; and
displaying a third text of the second message in the first message or a to the third text of the second message in the first message, wherein the first message does not contain the third text.

8. The non-transitory, computer-readable medium of claim 7, wherein removing the second message comprises changing a status of the second message to read.

9. The non-transitory, computer-readable medium of claim 7, wherein the third text of the second message or the reference to the third text is displayed in the first message after the second message is removed.

10. The non-transitory, computer-readable medium of claim 7, wherein causing the reference to be displayed further comprises causing an originator or a time of origin of the second text to be displayed in the first message.

11. The non-transitory, computer-readable medium of claim 7, further comprising:
in response to removing the second message, causing a reference to the second attachment to be displayed in the first message.

12. The non-transitory, computer-readable medium of claim 11, wherein causing the reference to be displayed further comprises causing an originator or time of origin of the second attachment to be displayed in the first message.

13. A system, comprising:
a processor;
a memory operatively connected to the processor and storing instructions that, when executed by the processor, cause:
receiving a first message and a second message;
determining that a first text of the first message matches a second text of the second message; determining that a first attachment of the first message matches a second attachment of the second message;
removing the second message in response to receiving notification that both the first text of the first message and the first attachment of the first message have been displayed completely; and
displaying a third text of the second message in the first message or a reference to the third text of the second message in the first message, wherein the first message does not contain the third text; and
displaying, in the first message, a third attachment of the second message or a reference to the third attachment of the second message, the third attachment being not contained in the first message.

14. The system of claim 13, wherein removing the second message comprises changing a status of the second message to read.

15. The system of claim 13, wherein the memory stores further instructions that, when executed by the processor, cause:
the third text of the second message or the reference to the third text to be displayed in the first message after the second message is removed.

16. The system of claim 13, wherein causing the reference to be displayed further comprises causing an originator or a time of origin of the second text to be displayed in the first message.

17. The system of claim 13, wherein the memory stores further instructions that, when executed by the processor, cause:
in response to removing the second message, causing a reference to the second attachment to be displayed in the first message.

18. The system of claim 17, wherein causing the reference to be displayed further comprises causing an originator or time of origin of the second attachment to be displayed in the first message.

* * * * *